(12) United States Patent
Asai et al.

(10) Patent No.: US 8,148,457 B2
(45) Date of Patent: Apr. 3, 2012

(54) ADHESIVE COMPOSITION AND FILM ADHESIVE

(75) Inventors: Takahiro Asai, Kawasaki (JP); Koichi Misumi, Kawasaki (JP); Atsushi Miyanari, Kawasaki (JP); Yoshihiro Inao, Kawasaki (JP); Akihiko Nakamura, Kawasaki (JP)

(73) Assignee: Tokyo Ohta Kogyo Co., Ltd., Kanagawa (JP)

( * ) Notice: Subject to any disclaimer, the term of this patent is extended or adjusted under 35 U.S.C. 154(b) by 284 days.

(21) Appl. No.: 12/514,633

(22) PCT Filed: Sep. 26, 2007

(86) PCT No.: PCT/JP2007/068668
§ 371 (c)(1),
(2), (4) Date: May 13, 2009

(87) PCT Pub. No.: WO2008/062603
PCT Pub. Date: May 29, 2008

(65) Prior Publication Data
US 2010/0075141 A1    Mar. 25, 2010

(30) Foreign Application Priority Data

Nov. 22, 2006    (JP) ................................. 2006-316094

(51) Int. Cl.
*C08L 31/00*    (2006.01)
(52) U.S. Cl. .............. 524/556; 428/355 AC; 428/355 R; 524/558; 524/559; 524/560; 524/561
(58) Field of Classification Search .............. 428/355 R, 428/355 AC; 524/556, 558, 559, 560, 561
See application file for complete search history.

(56) References Cited

U.S. PATENT DOCUMENTS

| | | | |
|---|---|---|---|
| 4,243,500 A | 1/1981 | Glennon | |
| 4,693,776 A | 9/1987 | Krampe et al. | |
| 5,573,778 A | 11/1996 | Therriault et al. | |
| 5,798,426 A * | 8/1998 | Anton et al. | ............. 526/318.41 |
| 6,337,288 B1 | 1/2002 | Ohya et al. | |
| 6,432,475 B1 | 8/2002 | Yamamoto et al. | |
| 6,489,396 B2 | 12/2002 | Nakamura et al. | |
| 7,262,242 B2 * | 8/2007 | Gielens et al. | ................. 524/523 |
| 2002/0091197 A1 | 7/2002 | Nakamura et al. | |
| 2002/0098352 A1 | 7/2002 | Kishioka | |
| 2002/0127821 A1 | 9/2002 | Ohya et al. | |
| 2005/0170612 A1 | 8/2005 | Miyanari et al. | |
| 2005/0182150 A1 | 8/2005 | Bamborough et al. | |

FOREIGN PATENT DOCUMENTS

| | | |
|---|---|---|
| JP | 61-158145 | 7/1986 |
| JP | 02-003483 | 1/1990 |
| JP | 07-233356 | 9/1995 |
| JP | 7-268037 | 10/1995 |
| JP | 2001-279208 | 10/2001 |
| JP | 2003-173993 | 6/2003 |
| JP | 2003-292931 | 10/2003 |
| JP | 2003-313518 | 11/2003 |
| JP | 2007-119646 | 5/2007 |

OTHER PUBLICATIONS

International Search Report for corresponding application No. PCT/JP2007/068668 issued Jan. 8, 2008.

\* cited by examiner

*Primary Examiner* — David W Wu
*Assistant Examiner* — Marie Reddick
(74) *Attorney, Agent, or Firm* — Renner, Otto, Boisselle & Sklar, LLP (57) ABSTRACT

Disclosed is an adhesive composition whose component is a polymer obtained by copolymerizing a monomer composition containing styrene, a (meth)acrylic acid ester having a cyclic structure, and an alkyl(meth)acrylate having a chain structure. The monomer composition further contains a carboxylic acid having an ethylene double bond, a bifunctional monomer, and a styrene macromonomer. The polymer has a styrene block segment. This can improve heat resistance, adhesive strength in a high temperature environment, alkaline resistance, and easiness in stripping of an adhesive composition that has been subjected to a high temperature process. As a result, there can be obtained an adhesive composition which has high heat resistance, adhesive strength in a high temperature environment, and alkali resistance, and which can be easily stripped off after the adhesive composition is processed at a high temperature.

16 Claims, 1 Drawing Sheet

ADHESIVE COMPOSITION AND FILM ADHESIVE

This application is a 371 of PCT/JP2007/068668, filed on Sep. 26, 2007, which claims priority to JP 2006-316094 filed on Nov. 22, 2006.

TECHNICAL FIELD

The present invention relates to an adhesive composition and a film adhesive. More specifically, the present invention relates to an adhesive composition and a film adhesive, each for temporarily fixing a sheet or a protection board to a semiconductor product, in a step of carrying out processing such as grinding of semiconductor products (e.g., semiconductor wafer), optical products, and the like.

BACKGROUND ART

In recent years, due to multiple functioning of mobile phones, digital AV devices, IC cards, and the like, demands have been increasing for downsizing, reduction in thickness, and high integration of semiconductor silicon chips (hereinafter referred to as "chips"). For example, the reduction of thickness is demanded for integrated circuits in which a plurality of chips are integrated, as typified by CSP (chip size package) and MCP (multi-chip package). Among these integrated circuits, a system-in-package (SiP) in which a plurality of semiconductor chips are mounted in a single semiconductor package has become an extremely important technique in order to accomplish downsizing, reduction in thickness, and high integration of chips that are installed in the semiconductor package. The downsizing, reduction in thickness and high integration enables realization of multiple functioning, downsizing, and reduction of weight of electronic devices.

In order to respond to the needs for a thin product, it is required to reduce the thickness of a chip to not more than 150 µm. Further, it is required to process the chip so that its thickness is reduced to not more than 100 µm for the CSP and the MCP, and not more than 50 µm for the IC card.

Conventionally, SiP products are manufactured by use of a method in which respective bumps (electrodes) provided on each of stacked chips are wired to a circuit board by a wire bonding technique. In order to respond to the demand for the reduction in thickness and high integration, a through-hole electrode technique is required, not the wire bonding technique. The through-hole electrode technique is a technique in which (i) chips each having a through-hole electrode are stacked and (ii) a bump is formed on a backside of the chips thus stacked.

A thin chip is manufactured by, for example, in a method as follows: (i) a high purity single crystal silicon or the like is sliced to a wafer form, (ii) a predetermined circuit pattern of an IC or the like is formed on a surface of the wafer by etching the surface of the wafer so that an integrated circuit is built, (iii) a back surface of the semiconductor wafer thus obtained is grinded by use of a grinder, and (iv) after the semiconductor wafer is grinded to a predetermined thickness, the semiconductor wafer is diced so as to form a chip shape. At this time, the predetermined thickness is around a range of 100 µm to 600 µm. Further, in a case where a through-hole electrode is to be formed, the wafer is grinded to a thickness of around a range of 50 µm to 100 µm.

In the manufacture of the semiconductor chip, the semiconductor wafer readily breaks in a case where external force is given to the wafer in the grinding step or at the time when the wafer is carried to the dicing step. This is because the semiconductor wafer is thin and fragile, and because circuit patterns are unlevel. Moreover, in the grinding step, purified water is used to clean the back surface of the semiconductor wafer for removing grinding dust and heat generated at the time of grinding, while grinding process is carried out. At this time, there is the need to prevent contamination of a circuit pattern surface due to the purified water used in cleaning.

Accordingly, in order to protect the circuit pattern surface of the semiconductor wafer and prevent breakage of the semiconductor wafer, a film adhesive for processing is attached on the circuit pattern surface while the grinding process is carried out.

Moreover, at the time of the dicing, the semiconductor wafer is diced in a state in which a protection sheet is attached to a back surface of the semiconductor wafer so that the semiconductor wafer is fixed. Chips obtained by the dicing are pushed up by use of a needle from a film base material side, and are fixed on a die pad.

Known types of film adhesives for processing and protection sheets as such include, for example, ones in which an adhesive layer made of an adhesive composition is provided on a base material film such as polyethylene terephthalate (PET), polyethylene (PE), polypropylene (PP), or ethylene-vinyl acetate copolymer (EVA) (for example, Patent Document 1, Patent Document 2, and Patent Document 3).

An arrangement has also been disclosed (Patent Document 4) in which a protection board is used instead of using the film adhesive for processing or the protection sheet. The protection board is an aluminum nitride-boron nitride pore sintered body impregnated with ladder-type silicone oligomer. In the arrangement, this protection board and the semiconductor wafer are adhered together by use of a thermoplastic film. There is also a method in which a material such as alumina, aluminum nitride, boron nitride, or silicon carbide, each of which has substantially the same thermal expansivity as the semiconductor wafer, is used as the protection board, and thermoplastic resin such as polyimide is used as an adhesive for attaching the protection board to the semiconductor wafer (Patent Document 5). This method suggests applying the adhesive in a form of a film having a thickness in a range of 10 µm to 100 µm. As a method for forming the film, the method of Patent Document 5 suggests that an adhesive composition is applied by spin coating and then dried so that an obtained film has a thickness of not more than 20 µm.

Moreover, due to multilayer interconnection of semiconductor elements, a process is conducted such that: (i) a protection board is adhered, by use of the adhesive composition, to a surface of the semiconductor wafer on which a circuit is formed; (ii) a back surface of the semiconductor wafer is polished; (iii) the back surface thus polished is etched to form a mirror plane; and (iv) a back surface circuit is formed on the mirror plane. In this case, the protection board is adhered to the semiconductor wafer until the back surface circuit is formed (Patent Document 6).

Patent Citation 1
Japanese Patent Application Publication, Tokukai, No. 2003-173993 A (Publication Date: Jun. 20, 2003)
Patent Citation 2
Japanese Patent Application Publication, Tokukai, 2001-279208 A (Publication Date: Oct. 10, 2001)
Patent Citation 3
Japanese Patent Application Publication, Tokukai, No. 2003-292931 A (Publication Date: Oct. 15, 2003)
Patent Citation 4
Japanese Patent Application Publication, Tokukai, N 2002-203821 A (Publication Date: Jul. 19, 2002)

Patent Citation 5

Japanese Patent Application Publication, Tokukai, No. 2001-77304A (Publication Date: Mar. 23, 2001)

Patent Citation 6

Japanese Patent Application Publication, Tokukaisho, No. 61-158145 (Publication Date: Jul. 17, 1986)

SUMMARY OF THE INVENTION

However, the following problems occur in a case where the conventional film adhesive for processing and the like are used in steps which require high temperature processing and high vacuum processing, as like in formation of the through-hole electrode: a problem of poor adhesion caused by insufficient adhesive strength in a high temperature environment or generation of gas in a high vacuum environment; or a problem of poor stripping such as residue remaining at the time of stripping following the high temperature processing.

For example, in the formation of the through-hole electrode, when semiconductor chips are connected to each other after formation of a bump on each of the semiconductor chips, a process is required which applies heat to the semiconductor chips to approximately 200° C., and further has the semiconductor chips to be in a high vacuum state. However, the adhesive composition which constructs an adhesive layer of a protection tape according to Patent Documents 1 and 2 has no resistance against such a high temperature of 200° C. Moreover, gas is generated due to application of heat. This gas causes the poor adhesion.

The thin semiconductor wafer requires to be stripped off from the protection board after the grinding and dicing. However, the adhesive composition which constructs an adhesive layer of a protection tape disclosed in Patent Document 3 is an epoxy resin composition. At a high temperature of 200° C., the epoxy resin changes in quality and cures. This causes residue to remain at the time of stripping, thereby causing poor stripping.

Further, in the thermoplastic film used for adhering a protection board to a semiconductor wafer in Patent Documents 4 and 5, gas derived from absorbed moisture is generated. This causes the problem of poor adhesion. The processing method of the semiconductor substrate according to Patent Document 6 carries out a mirror surfacing process by use of an etching liquid and formation of a metal film by vacuum plating. In order to carry out these processes, the adhesive composition for adhering a protection board to a semiconductor wafer requires heat resistance and stripping property. However, Patent Document 6 includes no disclosure regarding formation of the adhesive composition.

A study conducted by inventors of the present invention resulted in that, in processings of a semiconductor wafer and a chip, an adhesive which uses an acrylic resin material is preferably used, due to its crack resistance. However, the inventors found that the following problems occur even when the adhesive which uses such acrylic resin material is used:

(1) Adhesive strength is weak in a high temperature environment, due to an occurrence of a bubble-form strip on an adhesive surface at the time when the adhesive layer and the protection board are thermally compressed together, caused by generation of gas from moisture absorbed by the adhesive layer. Such generation of gas causes problems, not only that the adhesive strength is weakened in the high temperature environment, but also difficulty in production and maintenance of a vacuum environment in a case where processing is carried out under vacuum conditions.

(2) In a case where there is a step at which a semiconductor wafer has contact with an alkaline liquid such as an alkaline slurry or an alkaline developer, a contact surface of the adhesive composition deteriorates due to stripping, melting, diffusion or the like caused by the alkaline liquid.

(3) In a case where the adhesive is heated to approximately 200° C., the adhesive composition changes in quality due to low heat resistance. This causes poor stripping such as formation of insoluble substance in a stripping solution.

The present invention is accomplished in view of the above problems. An object of the present invention is to provide an adhesive composition (i) which has high adhesive strength in a high temperature environment, especially at a temperature of 140° C. to 200° C., high heat resistance, and high alkaline resistance, and (ii) which can be easily stripped off from a semiconductor wafer and a chip even after the adhesive composition is processed in a high temperature environment and/or in a high vacuum environment (hereinafter, simply referred to as a "high temperature process").

A first aspect of the present invention is an adhesive composition whose main component is a polymer prepared by copolymerizing a monomer composition containing styrene, a (meth)acrylic acid ester having a cyclic structure, and an alkyl(meth)acrylate having a chain structure, the monomer composition further containing a carboxylic acid having an ethylenic double bond, a bifunctional monomer, and a styrene macromonomer, and the polymer having a styrene block segment.

A second aspect of the present invention is a film adhesive including: a film; and an adhesive layer on the film, containing the adhesive composition of the present invention.

Additional objects, features, and strengths of the present invention will be made clear by the description below. Further, the advantages of the present invention will be evident from the following explanation in reference to the drawings.

DESCRIPTION OF EMBODIMENTS

One embodiment of the present invention is described below.

The present embodiment deals with an adhesive composition whose main component is a polymer obtained by copolymerizing a monomer composition containing styrene, a (meth)acrylic acid ester having a cyclic structure, and an alkyl(meth)acrylate having a chain structure. The monomer composition further contains a carboxylic acid having an ethylenic double bond, a bifunctional monomer, and a styrene macromonomer, and the polymer has a styrene block segment. The present invention is not limited to the descriptions below, but may be modified as appropriate within the gist of the present invention besides the foregoing embodiments and examples.

[Material of Monomer and Structure of Polymer that is Main Component of Adhesive Composition]

An adhesive composition according to the present embodiment includes, as its main component, a polymer obtained by copolymerizing a monomer composition, which monomer composition contains styrene, a (meth)acrylic acid ester having a cyclic structure, and an alkyl(meth)acrylate having a chain structure. This structure allows the adhesive composition to have, to a certain degree, heat resistance, adhesive strength in a high temperature environment, and alkaline resistance, and easiness in stripping off of the adhesive composition which has been subjected to a high temperature process.

Additionally, by further including, in the monomer component, a carboxylic acid having an ethylenic double bond, a bifunctional monomer, and a styrene macromonomer later described, and by further having the polymer having a styrene block segment later described, the adhesive strength in the high temperature environment, the heat resistance and the like further improves.

The "main component" in the present specification denotes that an amount of such component contained is more than any of other components contained in the adhesive composition. The amount of the main component contained is not limited as long as it is the most among all of the components that are contained in the adhesive composition. However, where an entire mass of the adhesive composition is 100 parts by mass, the amount of the main component contained is preferably in a range of not less than 50 parts by mass but not more than 100 parts by mass, and is further preferably in a range of not less than 70 parts by mass but not more than 100 parts by mass. The amount of the main component contained by not less than 50 parts by mass allows sufficient demonstration of an effect in accordance with the high heat resistance, high adhesive strength in a high temperature environment, alkaline resistance and easiness in stripping, each of which are properties of the adhesive composition.

(Styrene)

The adhesive composition according to the present embodiment contains styrene in the monomer composition. Properties of the styrene do not change even in a high temperature environment of not less than 200° C. This allows improvement in heat resistance of the adhesive composition.

A mixed amount of the styrene is not limited as long as copolymerization with other compounds contained in the monomer composition can proceed. However, where a total amount of the monomer composition that contains the styrene, the (meth)acrylic acid ester, and the alkyl(meth)acrylate is 100 parts by mass, the mixed amount of the styrene is preferably in a range of 10 to 50 parts by mass, and is further preferably in a range of 20 to 40 parts by mass. The mixed amount of not less than 10 parts by mass allows further improvement in the heat resistance, and the mixed amount of not more than 50 parts by mass enables suppression of a decrease in crack resistance.

((Meth)acrylic Acid Ester Having Cyclic Structure)

The adhesive composition according to the present invention contains, in the monomer composition, (meth)acrylic acid ester having a cyclic structure. This improves the heat resistance of the adhesive composition. Moreover, by containing the (meth)acrylic acid ester, it is possible to reduce a required amount of acrylic acid. This ensures a good stripping property by use of a stripping solution.

A mixed amount of the (meth)acrylic acid ester is not limited as long as copolymerization with other compounds contained in the monomer composition can proceed. However, the mixed amount of the (meth)acrylic acid ester is preferably in a range of 5 to 60 parts by mass, and is further preferably in a range of 10 to 40 parts by mass, where the total amount of the monomer composition that contains the styrene, the (meth)acrylic acid ester, and the alkyl(meth)acrylate is 100 parts by mass. The mixed amount of not less than 5 parts by mass allows further improvement of the heat resistance, and the mixed amount of not more than 60 parts by mass enables attainment of the good stripping property.

The (meth)acrylic acid ester has a structure in which a hydrogen atom in a carboxyl group of (meth)acrylic acid is substituted with a cyclic group or an organic group that has a cyclic group. The organic group that has the cyclic group is not particularly limited, however is preferably an alkyl group in which one hydrogen atom is substituted with a cyclic group.

The cyclic group may be, for example, an aromatic monocyclic or a polycyclic group in which at least one hydrogen atom is removed from benzene, naphthalene, or anthracene, or may be an aliphatic cyclic group. The cyclic group may further have a substituent later described.

The cyclic structure as a base ring of the cyclic group is constituted by carbon and hydrogen atoms. However, the cyclic structure is not limited to this, and may also have oxygen and nitrogen atoms. The cyclic structure is preferably a hydrocarbon group constituted by only carbon and hydrogen atoms. Further, it does not make any difference whether the hydrocarbon group may be saturated or unsaturated, but it is preferable that the hydrocarbon group be saturated. Moreover, the hydrocarbon group is preferably an aliphatic polycyclic group.

Specific examples of the aliphatic cyclic group encompass, for example, groups in which at least one hydrogen atom is removed from monocycloalkane or polycycloalkane such as dicycloalkane, tricycloalkane, or tetracycloalkane. More specifically, examples encompass groups in which at least one hydrogen atom is removed from monocycloalkanes such as cyclopentane or cyclohexane, or from polycycloalkanes such as adamantane, norbornane, isobornane, tricyclodecane, or tetracyclododecane. Among these groups, the groups in which at least one hydrogen atom is removed from cyclohexane or cyclopentane are preferable. Moreover, the cyclohexane and the cyclopentane may further have the substituent later described.

Examples of the substituent are, for example, a hydroxyl group, a carboxyl group, a cyano group, a polar group such as an oxygen atom (=O), or a straight or branched C1 to C4 lower alkyl group. In a case where the cyclic group further has the substituent, it is preferable for the cyclic group to have the polar group, the lower alkyl group, or both the polar group and the lower alkyl group. It is particularly preferable to have the polar group be the oxygen atom (=O).

An alkyl group in the alkyl group in which one hydrogen atom is substituted with a cyclic group is preferably a C1 to C12 alkyl group.

The (meth)acrylic acid ester having such a cyclic structure may be, for example, cyclohexyl(meth)acrylate, cyclopentyl (meth)acrylate, 1-adamantyl(meth)acrylate, norbornyl (meth)acrylate, isobornyl(meth)acrylate, tricyclodecanyl (meth)acrylate, or tetracyclododecanyl(meth)acrylate.

Further, such an alkylol group is preferably a C1 through C4 alkylol group. The (meth)acrylic acid ester having such a cyclic structure may be, for example, phenoxyethyl acrylate and phenoxypropyl acrylate.

The "aliphatic" in the present specification is a relative concept with respect to "aromatic", and is defined as a group, a compound or the like which is not aromatic. For example, an "aliphatic cyclic group" is a monocyclic group or a polycyclic group that is not aromatic.

It is also possible to use, as the (meth)acrylic acid ester, a (meth)acrylic acid ester which contains (i) (meth)acrylic acid ester having a cyclic structure which includes the substituent in the cyclic structure and (ii) a (meth)acrylic acid ester having a cyclic structure without the substituent in the cyclic structure.

Improvement in the heat resistance and flexibility is attained by simultaneously containing the (meth)acrylic acid ester having a cyclic structure which includes the substituent in the cyclic structure and the (meth)acrylic acid ester having a cyclic structure without the substituent in the cyclic structure.

(Alkyl(Meth)acrylate Having a Chain Structure)

The adhesive composition according to the present invention contains, in the monomer composition, an alkyl(meth)acrylate having a chain structure. This allows improvement in flexibility and crack resistance of an adhesive layer obtained from the adhesive composition.

A mixed amount of the alkyl(meth)acrylate is not limited, as long as copolymerization with other compounds contained in the monomer composition can proceed. However, the mixed amount of the alkyl(meth)acrylate is preferably in a range of 10 to 60 parts by mass, where a total amount of the monomer composition containing the styrene, the (meth)acrylic acid ester, and the alkyl(meth)acrylate is 100 parts by mass. The mixed amount of not less than 10 parts by mass allows improvement in the flexibility and crack resistance of the obtained adhesive layer. The mixed amount of not more than 60 enables suppression in an occurrence of: a decrease in heat resistance, poor stripping, and moisture absorbency.

In the present specification, the alkyl(meth)acrylate denotes acrylic long chain alkyl ester having a C15 to C20 alkyl group, and acrylic alkyl ester having a C1 to C14 alkyl group.

Examples of the acrylic long chain alkyl ester encompass: an alkyl ester of an acrylic or methacrylic acid, whose alkyl group is an n-pentadecyl group, an n-hexadecyl group, an n-heptadecyl group, an n-oxtadecyl group, an n-nonadecyl group, n-eicosyl group, or the like. Note that the alkyl group may be of a branched state.

Publicly known acrylic alkyl esters that are used in existing acrylic adhesives are examples of the acrylic alkyl esters having the C1 to C14 alkyl group. Examples of these acrylic alkyl esters are, for example, alkyl esters of acrylic or methacrylic acid whose alkyl group is a methyl group, an ethyl group, a propyl group, a butyl group, a 2-ethylhexyl group, an isooctyl group, an isononyl group, an isodecyl group, a dodecyl group, a lauryl group, a tridecyl group, or the like.

(Carboxylic Acid Having Ethylenic Double Bond)

The monomer composition further contains a carboxylic acid having an ethylenic double bond. The adhesive composition obtained by containing the carboxylic acid having the ethylenic double bond improves (i) adhesive strength in a high temperature environment, particularly at a temperature in a range of 140° C. to 200° C., and (ii) heat resistance. Further, the adhesive composition can easily be stripped off even after the adhesive composition has been subjected to a high temperature process.

These effects are attained due to an improvement in polarity of the adhesive composition on an interface between the adhesive composition and an adhered surface on which the adhesive composition is applied, which results from an increase of a hydroxyl group (polar group) derived from the carboxylic acid in the adhesive composition. In addition, these effects are attained due to suppression of dissociation between molecular chains in the adhesive composition, which dissociation occurs in the high temperature environment.

The carboxylic acid is not limited as long as the carboxylic acid has an ethylenic double bond and can be copolymerized with monomer components other than the carboxylic acid, however is preferably a carboxylic acid which is represented by General Formula (1) as follows:

Chem. 1

(1)

where $R^1$ is a C2 to C20 organic group having a (meth)acryloyl group or a vinyl group, and may have an oxygen atom; and m represents an integer of 1 to 3. Further, the carboxylic acid is preferably a (meth)acrylic acid or a carboxylic acid represented by General Formula (2) as follows:

Chem. 2

(2)

where $R^2$ is a hydrogen atom or a C1 to C4 alkyl group; $R^3$ is a divalent C1 to C5 alkylene group or a divalent C4 to C20 organic group having a cyclic structure; and $R^2$ and $R^3$ may have an oxygen atom. Specific examples of the carboxylic acid represented by General Formula (2) encompass carboxylic acids where $R^3$ has a group in which two hydrogen atoms are removed from cyclohexane, norbornane, tricyclodecane, or tetracyclododecane. These carboxylic acids may be used solely, or two or more of the carboxylic acids may be used in combination. Among these carboxylic acids, the (meth)acrylic acid is more preferred. Copolymerization of these carboxylic acids with other components in the monomer composition progresses favorably, and further stabilizes a polymer structure obtained from the copolymerization. As a result, the dissociation between the molecular chains is prevented, which allows improvement of the heat resistance and the adhesive strength in a high temperature environment.

A mixed amount of the carboxylic acid is set as appropriate in accordance with an aimed property of the adhesive composition such as aimed adhesive strength and the like, however is preferably in a range of 1 to 10 parts by mass and further preferably in a range of 1 to 5 parts by mass, where a total amount of the styrene, the (meth)acrylic acid ester and the alkyl(meth)acrylate is 100 parts by mass. The mixed amount of not less than 1 part by mass allows further improvement in the heat resistance and the adhesive strength in a high temperature environment of the obtained adhesive composition. The mixed amount of not more than 10 parts by mass suppresses moisture absorbency of the adhesive composition, which prevents gelling of the adhesive composition. Moreover, by reducing the amount of the carboxyl group included in the adhesive composition, the alkaline resistance also improves.

(Bifunctional Monomer)

The monomer composition further contains a bifunctional monomer. By containing the bifunctional monomer, constituent molecules of an obtained adhesive composition are cross-linked via the bifunctional monomer. A three-dimensional structure is generated due to the crosslinking, which causes an increase in mass-average molecular weight of the adhesive composition. It is generally known in the technical field of adhesives that the increase in the mass-average molecular weight of the constituent molecules improves internal energy of the adhesive composition. It is also known that the internal energy is one cause of an obtained strength of the adhesive strength in the high temperature environment. Moreover, the increase in the mass-average molecular weight of the adhesive composition causes a rise in an apparent glass transition point. As a result of this, the adhesive strength improves. That is to say, by further containing the bifunctional monomer in the monomer composition, the mass-average molecular weight of the adhesive composition increases, which causes the adhesive strength to increase in the high temperature environment.

Further, by containing the bifunctional monomer in the monomer composition, it is possible to suppress an occurrence of dissociation between molecular chains in a high temperature environment, which dissociation occurs within the adhesive composition. This causes an improvement in the adhesive strength at a high temperature, and even after the high temperature process is carried out to the adhesive composition, the adhesive composition can be easily stripped off. Moreover, even if the amount of the carboxylic acid is slightly reduced, it is still possible to obtain effects such as improvement in heat resistance and the like, thereby further improving the alkaline resistance of the adhesive composition.

Consequently, the inclusion of the bifunctional monomer in the monomer composition attains improvement, in the adhesive composition, in the heat resistance, the adhesive strength in a high temperature environment (particularly in a range from 140° C. to 200° C.), and the easiness in stripping of the adhesive composition that has been subjected to a high temperature process.

The bifunctional monomer in the present specification denotes a compound which has two functional groups. Namely, the bifunctional monomer is not limited as long as the bifunctional monomer is a compound which has two functional groups. However, it is preferable for the bifunctional monomer to be at least one of a bifunctional monomer selected from the group consisting of compounds represented by General Formula (3) as follows:

Chem. 3

$$X^1-R^4-X^2 \quad (3)$$

where $R^4$ is an organic group selected from a divalent C2 to C20 alkyl group and a divalent C6 to C20 organic group having a cyclic structure, and may have an oxygen atom; and $X^2$ are independently a (meth)acryloyl group or a vinyl group. Examples of the compounds represented by the general Formula (3) encompass: dimethylol-tricyclodecane diacrylate, neopentyl glycol diacrylate, 1,9-nonanediol acrylate, naphthalene diacrylate, and compounds represented by Formula (4) as follows:

Chem. 4

(4)

where $R^5$ and $R^6$ are independently ethylene oxide or propylene oxide; and n and s independently represent an integer of 0 to 4. These compounds may be used solely, or two or more of the compounds may be used in combination.

Among these bifunctional monomers, it is further preferable for the bifunctional monomer to be at least one bifunctional monomer selected from the group consisting of dimethylol-tricyclodecane diacrylate, neopentyl glycol diacrylate, 1,9-nonanediol acrylate, naphthalene diacrylate, and the compounds represented by the Formula (4). These bifunctional monomers can be readily cross-linked with other monomer composition components, and crosslinking structures of such cross-linked bifunctional monomers are stable. Therefore, it is possible to obtain an adhesive composition which has further improved adhesive strength in a high temperature environment and further improved heat resistance.

An amount of the bifunctional monomer is set as appropriate in accordance with an aimed property of the adhesive composition such as aimed adhesive strength, however is preferably in a range of 0.1 to 0.5 parts by mass, and is further preferably in a range of 0.1 to 0.3 parts by mass, where a total amount of the styrene, the (meth)acrylic acid ester, and the alkyl(meth)acrylate is 100 parts by mass. The amount in the range of 0.1 to 0.5 parts by mass allows further improvement in the adhesive strength in a high temperature environment and the heat resistance of the adhesive composition thus obtained. The amount in that range also suppresses moisture absorption, thereby making it possible to prevent gelling of the adhesive composition.

(Styrene Macromonomer)

The monomer composition may further contain a styrene macromonomer. Containing of the styrene macromonomer allows an increase of a mass-average molecular weight of an obtained adhesive composition. Further, dissociation between molecular chains in the adhesive composition which occurs in a high temperature environment is suppressed. Therefore, it is possible to further improve the heat resistance, the adhesive strength in the high temperature environment (particularly in a range of 140° C. to 200° C.), and the easiness of stripping following a high temperature process, of the adhesive composition. Even when the amount of the carboxylic acid is reduced, it is still possible to obtain effects such as improvement in heat resistance and the like, thereby further improving the alkaline resistance of the adhesive composition.

The styrene macromonomer is not limited as long as (i) a styrene block structure is included in the structure of the styrene macromonomer, and (ii) the styrene macromonomer can be copolymerized with other components of the monomer composition. However, it is preferable for the styrene macromonomer to have a styrene block structure and organic groups positioned on both ends of the styrene block structure, at least one of the organic groups having a carbon-carbon double bond. The styrene macromonomer is further preferably a styrene macromonomer represented by the following Formula (5):

Chem. 5

(5)

where $R^7$ and $R^8$ are independently one selected from the group consisting of C1 to C10 organic groups having at least one carbon-carbon double bond, and $R^7$ and $R^8$ may have an oxygen atom. The styrene macromonomer is easily copolymerized with compounds other than the styrene macromonomer contained in the monomer composition. This causes a further increase in average molecular weight of an obtained adhesive composition and suppresses dissociation between molecular chains in the adhesive composition.

The number of styrene which form the styrene block structure in the styrene macromonomer is not particularly limited, and may be set as appropriate in accordance with an aimed property of the adhesive composition such as an aimed adhesive strength, heat resistance or the like. However, the number of styrene is preferably in a range of 20 to 100, and is further preferably in a range of 50 to 70.

Specific examples of the styrene macromonomer encompass: macromonomer (grade: AS-6S, manufactured by Toagosei Co., Ltd.) and macromonomer (grade AN-6S, manufactured by Toagosei Co., Ltd.). These styrene macromonomers may be used solely, or two or more styrene macromonomers may be used in combination. Copolymerization of these styrene macromonomers with other components of the monomer composition progress favorably, and further stabilizes a polymer structure obtained due to the copolymerization. Hence, dissociation between molecular chains can be prevented. As a result, the thermal resistance and the adhesive strength in the high temperature environment are improved.

An amount of the styrene macromonomer may be set as appropriate in accordance with the aimed property of the adhesive composition such as the aimed adhesive strength, heat resistance or the like. However, a total amount of the styrene and the styrene macromonomer is in a range of 30 to 90 parts by mass, and preferably in a range of 40 to 60 parts by mass. The amount of the styrene macromonomer is preferably in a range of 5 to 40 parts by mass within the range of the total amount of the styrene and the styrene macromonomer. Further preferably, the total amount of the styrene and the styrene macromonomer is in the range of 30 to 90 parts by mass, and within the range of the total amount of the styrene and the styrene macromonomer, the amount of the styrene is in a range of 10 to 20 parts by mass. The amount in this range allows the adhesive composition to contain the styrene and the styrene macromonomer in a suitable proportion. That is to say, the adhesive composition can attain both the effect of improvement in the heat resistance due to the styrene and the effect of improvement in the adhesive strength in the high temperature environment due to the styrene macromonomer.

(Styrene Block Segment)

The polymer which is the main component of the adhesive composition according to the present embodiment has a styrene block segment.

An adhesive composition whose main component is a polymer having a styrene block segment prevents generation of gas on an interface between the adhesive composition and an adhered object. Therefore, it is possible to obtain an adhesive composition which prevents stripping and the like of the adhesive composition caused by generation of gas on the interface at the time of heating and vacuuming, and which has an improved adhesive strength in a high temperature environment.

Moreover, dissociation of molecular chains of the adhesive composition is suppressed in the high temperature environment. This makes it possible to prevent quality changes of the adhesive composition in the high temperature environment. Hence, the adhesive strength improves, and furthermore, the adhesive composition is easily stripped even after the adhesive composition is processed at a high temperature. Further, even when the amount of the carboxylic acid is slightly reduced, it is still possible to obtain effects such as improvement in heat resistance and the like, thereby further improving the alkaline resistance of the adhesive composition.

Hence, it is possible to further improve the heat resistance, adhesive strength in a high temperature environment (particularly in a range of 140° C. to 200° C.), and easiness in stripping after the adhesive composition has been subjected to the high temperature process, each of the adhesive composition.

The "styrene block segment" in the present specification is a part in which the styrene is copolymerized by units of blocks in the polymer. Addition of the styrene after polymerization has been initiated causes the styrene to be formed in a block unit just including the styrene. This is because, at this point, copolymerization of other components have been mostly completed. As such, the styrene block segment is a block copolymer obtained by polymerization of just the styrene that is added after the initiation of polymerization of other monomer components.

(Components Other than Main Component in Adhesive Composition)

The adhesive composition according to the present embodiment may contain acrylamide such as dimethyl acrylamide and morpholine such as acryloylmorpholine, as an other additive component. Containing of such an additive component allows concurrent improvement of the heat resistance and adhesiveness.

The adhesive composition according to the present embodiment may further include, to an extent in which essential properties of the present invention is not lost, miscible additives, for example, a commonly used addition resin, plasticizing agent, adhesive auxiliary agent, stabilization agent, coloring agent, and surface active agent, each of which improves effectiveness of the adhesive.

Further, the adhesive composition may be diluted by use of an organic solvent for adjusting viscosity of the adhesive composition, in the extent in which the essential properties of the present invention is not lost. Examples of the organic solvent encompass: ketones such as acetone, methyl ethyl ketone, cyclohexanone, methyl isoamyl ketone, and 2-heptanone; polyhydric alcohols and derivatives thereof such as monomethyl ethers, monoethyl ethers, monopropyl ethers, monobutyl ethers, or monophenyl ethers of ethylene glycol, ethylene glycol monoacetate, diethylene glycol, diethylene glycol monoacetate, propylene glycol, propylene glycol monoacetate, dipropylene glycol, or dipropylene glycol monoacetate; cyclic ethers such as dioxane; and esters such as methyl lactate, ethyl lactate, methyl acetate, ethyl acetate, butyl acetate, methyl pyruvate, ethyl pyruvate, methyl methoxy propionate, and ethyl methoxy propionate. These organic solvents may be used solely, or two or more of the organic solvents may be used in combination. Particularly, it is preferable to use the polyhydric alcohols and derivatives thereof such as the monomethyl ethers, monoethyl ethers, monopropyl ethers, monobutyl ethers, and monophenyl ethers of ethylene glycol, ethylene glycol monoacetate, diethylene glycol, diethylene glycol monoacetate, propylene glycol, propylene glycol monoacetate, dipropylene glycol, or dipropylene glycol monoacetate.

An amount of the organic solvent used is set as appropriate in accordance with a film thickness of the adhesive composition to be applied, and is not particularly limited as long as the adhesive composition is in a concentration which is applicable to a supporting body such as a semiconductor wafer or the like. Generally, the adhesive composition is used so that a solid content concentration is in a range of 20 mass % to 70 mass %, and preferably in a range of 25 mass % to 60 mass %.

[Copolymerization Reaction]

The adhesive composition of the present embodiment may be produced by carrying out copolymerization reaction of the monomer composition. A method for copolymerizing the monomer composition is not especially limited, and the copolymerization reaction of the monomer composition may be carried out by stirring the monomer composition by use of an existing stirring device.

The following deals with (i) a preferable method for mixing components except for a main component, that is, a carboxylic acid having an ethylenic double bond, bifunctional monomer, and a styrene macromonomer and (ii) a method for forming a styrene block segment in the polymer. However, the present invention is not limited to these.

(Mixing of Carboxylic Acid Having Ethylenic Double Bond)

Timing for mixing the carboxylic acid having an ethylenic double bond is not limited provided that the carboxylic acid can be copolymerized with components other than the carboxylic acid in the monomer composition.

That is to say, the carboxylic acid may be preliminarily mixed with the components other than the carboxylic acid in the monomer composition before copolymerization reaction is initiated. Alternatively, the carboxylic acid may be mixed between initiation and termination of copolymerization reaction of the components other than the carboxylic acid. Especially, it is preferable that copolymerization reaction be initiated by preliminarily mixing the carboxylic acid with the styrene, the (meth)acrylic acid ester, and the alkyl(meth)acrylate. The copolymerization reaction of a monomer composition in which the carboxylic acid has been preliminarily mixed causes the carboxylic acid to be randomly copolymerized with the components other than the carboxylic acid. As a result, the aforementioned polar groups are uniformly formed in an obtained adhesive composition, thereby improving polarity of the adhesive composition on an interface between the adhesive composition and an adhered object. This further suppresses dissociation between molecular chains in the adhesive composition in a high temperature environment, thereby further improving the adhesive strength.

The "initiation of copolymerization reaction" in the present specification denotes a point of time when a copolymerization reaction initiates in the monomer composition constituted by mixture compounds other than a compound to be mixed after the initiation of the copolymerization reaction.

The "initiation of copolymerization reaction" may be a point of time when mixing of components that are to be mixed in advance is completed in a case where production of the adhesive composition is actually conducted. Further, in a case where a reaction container equipped with a stirrer is used, the "initiation of copolymerization reaction" may be a point of time when stirring is initiated after at least part of each of all components that are to be mixed in advance is added in the reaction container. Moreover, in a case where a predetermined reaction temperature of the copolymerization reaction is set, the "initiation of copolymerization reaction" may be a point of time when heating is started for a temperature to reach the reaction temperature. Alternatively, in a case where the polymerization initiator is used, the "initiation of copolymerization reaction" may be a point of time when the polymerization initiator is added.

The effect of the present invention is attainable regardless of which point of time is taken as the "initiation of copolymerization reaction". Consequently, the "initiation of copolymerization reaction" may be set in accordance with production equipment, conditions and the like of the adhesive composition as appropriate, and control may be carried out to subsequent steps and the like.

Further, in the present specification, "completion of the copolymerization reaction" denotes a point of time when a desired copolymerization reaction is attained. More specifically, the production of the adhesive composition is sufficiently carried out by taking the "completion of the copolymerization reaction" as a point of time when the stirring is stopped, or a point of time when cooling of the reaction temperature is started.

(Mixing of Bifunctional Monomer)

It is most preferable that the bifunctional monomer be preliminarily mixed with components other than the bifunctional monomer in the monomer composition before the copolymerization reaction is initiated, but the mixing of the bifunctional monomer is not limited to this. For example, even when part of or all the bifunctional monomer is mixed with the components other than the bifunctional monomer in the monomer composition after the copolymerization reaction has been initiated, it is possible to obtain the same effects such as the increase in mass average molecular weight of the adhesive composition and the improvement in adhesive strength in a high temperature environment.

(Mixing of Styrene Macromonomer)

Timing of mixing of the styrene macromonomer is not especially limited provided that the styrene macromonomer can be copolymerized with components other than the styrene macromonomer in the monomer composition.

In other words, the styrene macromonomer may be added to the monomer composition that has not been copolymerized yet, or the styrene macromonomer may be added between initiation and termination of copolymerization reaction that is initiated by mixing the components other than the styrene macromonomer. It is preferable that the styrene macromonomer be added after the copolymerization reaction of the components other than the styrene macromonomer in the monomer composition is initiated. It is further preferable that the styrene macromonomer be added, at once or stepwise, to the monomer composition in which the copolymerization reaction has been initiated. The mixing of the styrene macromonomer in such a manner causes the adhesive composition to have parts in which styrene block structures derived from the styrene macromonomer are closely formed, which parts are unevenly located in the adhesive composition. The mixing of the styrene macromonomer in such a manner can further suppress dissociation between molecular chains in a high temperature environment, thereby resulting in that the adhesive strength is improved in the high temperature environment.

(Formation of Styrene Block Segment)

The styrene block segment is formed such that all or part of styrene used in production of the adhesive composition of the present embodiment is added, at once or stepwise, to a copolymerization reaction system, that is, a reaction container or the like in which copolymerization reaction of a remaining part of the styrene, the (meth)acrylic acid ester, and the alkyl (meth)acrylate is being carried out. The all or part of the styrene is added between initiation and termination of the copolymerization reaction.

An amount of the styrene for forming the styrene block segment is adjusted by an amount of the styrene to be added after the copolymerization reaction is initiated. The amount of the styrene for forming the styrene block segment may be set as appropriated in accordance with aimed properties of the adhesive composition such as intended adhesive strength, heat resistance, and the like. However, the amount of the styrene for forming the styrene block segment is preferably in a range of 5 to 80 parts by mass, more preferably in a range of 10 to 30 parts by mass, where a total amount of the styrene to be used in the production of the adhesive composition of the present invention is 100 parts by mass.

Moreover, the styrene to be added after the copolymerization reaction is initiated is preferably added at once, that is, all the styrene is added at once. Further, it is preferable that the styrene be added before half a time required for the copolymerization reaction passes. This causes the styrene to be closely copolymerized, thereby favorably forming a styrene block segment in the adhesive composition.

(Other Conditions for Copolymerization Reaction)

A temperature condition of the copolymerization reaction may be set as appropriate, and is not limited. However, the temperature is preferably in a range of 60 to 150° C., further preferably in a range of 70 to 120° C.

In the copolymerization reaction, a solvent may be used as appropriate. The aforementioned organic solvents can be used as the solvent. Among the aforementioned organic solvents, propylene glycol monomethyl ether acetate (hereinafter, referred to as "PGMEA") is preferable.

In the copolymerization reaction according to the present embodiment, a polymerization initiator may be used as appropriate. Examples of the polymerization initiator encompass: azo compounds such as 2,2'-azobisisobutylonitrile, 2,2'-azobis(2-methylbutylonitrile), dimethyl 2,2'-azobis isobutyrate, 1,1'-azobis(cyclohexane-1-carbonitrile), and 4,4'-azobis(4-cyanovaleric acid); and organic peroxides such as decanoyl peroxide, lauroyl peroxide, benzoyl peroxide, bis (3,5,5-trimethyl hexanoyl) peroxide, succinic acid peroxide, tert-butyl peroxy-2-ethylhexanoate, tert-butyl peroxypivalate, and 1,1,3,3-tetramethylbutylperoxy-2-ethylhexanoate. These polymerization initiators may be used solely, or two or more of the polymerization initiators may be used in combination as appropriate. An amount of the polymerization initiator to be used may be set as appropriate in accordance with a combination of the monomer composition, reaction conditions, and the like, and is not particularly limited.

[Film Adhesive]

The adhesive composition according to the present invention as described above may be used in various ways depending on its purpose. For example, the adhesive composition in a liquid form may be applied on a processed body such as a semiconductor wafer so as to form an adhesive layer. Alternatively, a film adhesive according to the present invention, that is, a film such as a flexible film on which an adhesive layer containing any one of the foregoing adhesive compositions is formed in advance and dried, may be used by attaching this film (film adhesive) to the processed body (film adhesive method).

As such, the film adhesive according to the present invention includes a film, and an adhesive layer provided on the film, containing any one of the aforementioned adhesive compositions.

Since the monomer composition further contains the carboxylic acid, a polar group is introduced into the adhesive layer. This allows the film adhesive to have high heat resistance, high adhesive strength in a high temperature environment, and alkaline resistance. Further, this allows the film adhesive that has been subjected to a high temperature process to be easily stripped off.

Moreover, when the monomer composition further contains the bifunctional monomer, constituent molecules of the adhesive layer is crosslinked by the bifunctional monomer.

Additionally, when the monomer composition further contains the styrene macromonomer, an average molecular weight of an adhesive composition that forms the adhesive layer increases, and the adhesive layer is caused to have a styrene block structure derived from the styrene macromonomer. This further suppresses dissociation between molecule chains in the adhesive composition in a high temperature environment.

Furthermore, since the polymer that is the main component of the adhesive layer has a styrene block segment, it is possible to prevent gas generation on an interface between the adhesive composition and an adhered surface to which the adhesive composition is applied.

Hence, it is possible to obtain a film adhesive which has excellent heat resistance, adhesive strength in a high temperature environment, and alkaline resistance, and which excels in easiness of stripping.

The film adhesive may be used such that a protection film is further provided on the adhesive layer. In this case, the adhesive layer is easily provided on a processed body by stripping off the protection film which covers the adhesive (i) layer; (ii) placing, on the processed body, the adhesive layer thus exposed, and (iii) stripping off the film from the adhesive layer.

Consequently, the use of the film adhesive allows formation of a layer having an even thickness and a good surface smoothness as compared to a case where the adhesive composition is directly applied on a processed body so as to form an adhesive layer.

The film to be used in manufacture of the film adhesive is not limited, as long as an adhesive layer formed on the film is strippable from the film and the film is a release film which can transfer the adhesive layer to a surface to be processed of a protection board, a wafer, or the like. An example of the film is a flexible film made of a synthetic resin film such as polyethylene terephthalate, polyethylene, polypropylene, polycarbonate or polyvinyl chloride, and having a thickness of 15 µm to 125 µm. It is preferable for the film to be strip-processed if necessary so that transfer can be readily carried out.

A well-known method may be appropriately used as a method for forming the adhesive layer on the film, in accordance with a desired thickness and evenness of the adhesive layer, and is not particularly limited to which method is used. For example, a method may be used in which the adhesive composition according to the present invention is applied on a film by use of an applicator, a bar coater, a wire bar coater, a roll coater, or a curtain flow coater, so that a dried thickness of the adhesive layer is in a range of 10 µm to 1000 µm. Among the coaters, the roll coater is preferable since the roll coater excels in evenness of the film thickness, and is capable of efficiently forming a thick film.

In a case where the protection film is to be used, the protection film to be used is not limited as long as the film is strippable from the adhesive layer. However, it is preferable for the protection film to be, for example, a polyethylene terephthalate film, a polypropylene film, or a polyethylene film. Moreover, the protective film is preferably coated with silicon or baked. This allows the protective film to be easily stripped off from the adhesive layer. A thickness of the protection film is not particularly limited, however is preferably in a range of 15 μm to 125 μm. This is because the adhesive film attached to the protective film can secure flexibility of the film adhesive.

A method of using the film adhesive is not particularly limited. For example, the following method may be taken in a case where the protection film is used: (i) the protection film is stripped off from the film adhesive, (ii) the adhesive layer thus exposed is placed on a surface of a processed body, and (iii) a heating roller is rolled on the film (back surface of the surface on which the adhesive layer is formed), so that the adhesive layer is thermally compressed onto the surface of the processed body. At this time, by sequentially rolling up the protection film on a reel roller or the like, the protection film that is stripped off from the film adhesive may be stored and reused.

The adhesive composition of the present embodiment is not particularly limited as long as the adhesive composition is used for adhering purposes. However the adhesive composition is suitably used as an adhesive composition for adhering a high-precision processing protection board of a semiconductor wafer to a substrate such as a semiconductor wafer. The adhesive composition of the present invention is particularly suitably used as an adhesive composition, when a substrate such as the semiconductor wafer is grinded so that a thickness of the substrate is reduced, for attaching the substrate to a support plate (e.g., Japanese Patent Application Publication, Tokukai, No. 2005-191550).

[Stripping Solution]

A commonly used stripping solution may be used as a stripping solution for removing the adhesive composition according to the present embodiment, however from a point of environmental burden and a stripping property, a stripping solution whose main component is PGMEA, ethyl acetate, or methyl ethyl ketone is preferably used.

EXAMPLES

The following description explains Examples which demonstrate an adhesive strength and the like of an adhesive composition according to the present invention.

Note that evaluations of adhesive compositions of the following Example and Comparative Example were carried out by measuring, for each of the adhesive compositions, (i) heat resistance, (ii) moisture absorbency, (iii) flexibility, (iv) adhesive strength in different temperature conditions, and (v) an amount of gas generated (hereinafter referred to as "generated gas") at a temperature of 200° C. Measuring methods of each of the items are explained below.

(Method for Measuring Heat Resistance, Moisture Absorbency, and Generated Gas)

After applying adhesive compositions according to Example 1 and Comparative Example 1 later described on silicon wafers, respectively, thus applied films were heated from 40° C. to 250° C. A degassing amount from each of the applied films was measured, and evaluation was made from the amount of gas thus measured.

Reasons why thermal resistance and moisture absorbency can be evaluated from the degassing amount are as follows. That is, the degassing amount measured until a temperature increased to 100° C., is an amount of gas derived from either water vapor or its azetropic gas. The water vapor or the azetropic gas is derived from moisture absorbed by the adhesive composition. Thus, it is possible to evaluate the moisture absorbency from the degassing amount measured until the temperature reached 100° C. The degassing amount measured at a temperature not less than 100° C. is derived from gas that has been generated due to decomposition of the adhesive composition caused by heat. Therefore, the thermal resistance can be evaluated from the degassing amount at a temperature of not less than 100° C., particularly around 200° C.

A TDS method (Thermal Desorption Spectroscopy method) was used for measuring the degassing amount. EMD-WA1000, manufactured by ESCO, Ltd. was used as a TDS measuring device (discharged gas measuring device).

A measuring condition of the TDS device was set as Width: 100; Center Mass Number: 50; Gain: 9; Scan Speed: 4; and Emult Volt: 1.3 KV.

The thermal resistance was evaluated at a temperature of 200° C. based on definitions as follows: "G (good)" indicates a case where a strength (Indensity) found by the TDS measuring device was not more than 100000, and no residue was observed by a metallurgical microscope; "S (sufficient)" indicates a case where the Indensity was not less than 100000, however no residue was observed by the metallurgical microscope; and "P (poor)" indicates a case where the Indensity was not less than 100000 and a residue was observed by the metallurgical microscope.

The moisture absorbency was evaluated at a temperature of 100° C. based on definitions as follows: "G" indicates a case where the Indensity was not more than 10000; and "P" indicates a case where the Indensity was not less than 10000.

The generated gas was evaluated at a temperature of 200° C. based on definitions as follows: "G" indicates a case where the strength (Indensity) found by the TDS measuring device was not more than 100000; and "P" indicates a case where the Indensity was not less than 100000.

(Adhesive Strength at Various Temperatures)

After the adhesive compositions according to Example 1 and Comparative Example 1 were applied on silicon wafers, respectively, the adhesive compositions were dried for three minutes at a temperature of 150° C. Next, a glass substrate was adhered to each of the adhesive compositions at a temperature of 200° C. and with a load of 1 kg. Thereafter, each of the glass substrates was pulled so that an adhesive strength at a time when each of the glass substrates were stripped from each of the silicon wafers was found by use of a vertical model motorized stand "MX-500N" (manufactured by IMADA CO., LTD.).

(Evaluation of Flexibility)

After the adhesive compositions were applied on 6-inch silicon wafers, respectively, by use of a spinner at a speed of 1000 rpm for 25 seconds, each of the adhesive compositions was heated on a hotplate at a temperature of 200° C. for three minutes. As such, each coated film layer on each of the silicon wafer was obtained. Subsequently, whether or not there were cracks on the coated film layers was observed; a coated film layer that had a crack was evaluated as "P", and a coated film layer that did not have a crack was evaluated as "G". Note that the silicon wafers that were used had thickness of 15 μm.

(Evaluation of Alkaline Resistance)

The alkaline resistance was evaluated as follows. After the adhesive compositions according to Example 1 and Comparative Example 1 were applied on the silicon wafers, respectively, the adhesive compositions thus applied were dried at a temperature of 200° C. for three minutes. Next, these dried adhesive compositions were immersed in a 2.38 mass % TMAH (tetramethyl ammonium hydroxide) aqueous solution. Subsequently, it was observed by visual inspection whether or not the applied films melted. If the melting of the applied film was not observed, the adhesive composition was evaluated as "G"; if the melting was observed, the adhesive composition was evaluated as "P".

(Evaluation of Adhesiveness)

Adhesiveness of each of the adhesive compositions according to Example 1 and Comparative Example 1 was evaluated. Specifically, the adhesive compositions of Example 1 and Comparative Example 1 were applied on silicon wafers, respectively, and heated at a temperature of 200° C. for three minutes, so as to form adhesive layers, respectively. Further, glass plates were attached to a respective of the adhesive layers by thermocompression at a temperature of 150° C. for two minutes. Then, it was observed, for each of the adhesive compositions, whether or not the adhesive composition remained on the silicon wafer when the glass plate was detached from the silicon wafer, at each of temperatures of 23° C., 60° C., 140° C., and 200°. If there was no residue of the adhesive composition, the adhesiveness was evaluated as "G"; if there was a residue of the adhesive composition, the adhesiveness was evaluated as "P". Furthermore, surfaces of the silicon wafers from which the glass plates had been detached, were observed by use of an optical microscope (MX50, manufactured by Olympus Corporation) at 50-fold magnification.

Examples 1, Comparative Example 1

An adhesive composition (Example 1) was prepared by use of a monomer composition which contains styrene, a (meth) acrylic acid ester having a cyclic structure, and an alkyl(meth) acrylate having a chain structure, and which additionally contains a carboxylic acid having an ethylenic double bond, a bifunctional monomer, and a styrene macromonomer, so that the adhesive composition includes a styrene block segment. Further, an adhesive composition (Comparative Example 1) was prepared by use of a monomer composition containing just styrene, a (meth)acrylic acid ester having a cyclic structure, and an alkyl(meth)acrylate having a chain structure. Properties of the adhesive composition of Example 1 were compared with those of the adhesive composition of Comparative Example 1.

Acrylic acid was used as the carboxylic acid having an ethylenic double bond. Dimethylol-tricyclodecane diacrylate (hereinafter, referred to as "DCPA") was used as the bifunctional monomer. A styrene macromonomer (product name: macromonomer, grade: AS-6S, manufactured by Toagosei Co., Ltd.; styrene macromonomer having methacryloyl group, molecular weight: 6000, hereinafter referred to as "MCST") was used as the styrene macromonomer.

In Example 1, as described later, a styrene block segment was formed as follows. In production of the adhesive composition, 40 parts by mass of styrene was used in total. Out of 40 parts by mass of the styrene, 20 parts by mass of the styrene was mixed with components other than the styrene in a monomer composition in a flask, and blowing of $N_2$ into the flask was started. After a temperature was increased to 90° C., a remaining part of the styrene (20 parts by mass) was added into the flask so that the styrene block segment was formed.

Table 1 shows (i) compositions of the monomer compositions obtained in Example 1 and Comparative Example 1 and (ii) average molecular weights of adhesive compositions, respectively obtained by polymerizing the monomer compositions of Example 1 and Comparative Example 1.

TABLE 1

| Composition (mass by part) | Example 1 | Comparative Example 1 |
|---|---|---|
| Methyl methacrylate | 15 | 15 |
| n-butyl methacrylate | 13 | 13 |
| Styrene | 20 | 52 |
| Styrene (mixed after copolymerization reaction is initiated) | 20 | 0 |
| Phenoxyethyl acrylate | 20 | 20 |
| DCPA | 0.1 | 0 |
| MCST | 12 | 0 |
| Acrylic acid | 5 | 0 |
| Average molecular weight | 88900 | 86000 |

The adhesive composition of Example 1 was obtained as follows.

Into a 300 ml four-neck flask equipped with a reflux condenser, a stirrer, a thermometer, and a nitrogen inlet tube, (i) 53.85 g of PGMEA as a solvent and (ii) as shown in Table 1, 20 g of phenoxyethyl acrylate, 15 g of methyl methacrylate, 13 g of n-butyl methacrylate, 20 g of styrene, 5 g of acrylic acid, 0.1 g of DCPA, and 12 g of MCST, those as monomers, were added, and blowing of $N_2$ into the flask was started. A mixture in the flask was stirred so as to initiate polymerization. While the mixture was being stirred, a temperature in the flask was increased to 90° C. Then, a mixed solution containing 13.33 g of PGMEA, 20 g of styrene, and 0.2 g of t-butyl peroxy-2-ethylhexanoate (polymerization initiator) was continuously dropped via a dropping nozzle into the flask over 2 hours. The dropping speed was maintained constant. Note that, in each of Example 1 and Comparative Example 1, an amount of the t-butyl peroxy 2-ethylhexanoate was adjusted so that an obtained adhesive composition had an average molecular weight as shown in Table 1.

After the dropping was completed, an obtained polymerization reaction solution was left for aging at 90° C. for 1 hour. Then, a mixed solution containing 25.10 g of PGMEA and 0.3 g of t-butyl peroxy 2-ethylhexanoate was dropped into the polymerization reaction solution over 1 hour. After the polymerization reaction solution was further left for aging at 90° C. for 1 hour, 1.0 g of 1,1,3,3-tetramethylbutylperoxy-2-ethylhexanoate was added thereto at once.

The polymerization reaction solution was then left for aging at 90° C. for 3 hours. After a temperature of the polymerization reaction solution was increased until a reflux of the solvent was observed, the polymerization reaction solution was left for aging for 1 hour. After that, the polymerization was terminated.

The adhesive composition of Comparative Example 1 was prepared as follows.

Into a 300 ml four-neck flask equipped with a reflux condenser, a stirrer, a thermometer, and a nitrogen inlet tube, (i) 53.85 g of PGMEA as a solvent and (ii) as shown in Table 1, 20 g of phenoxyethyl acrylate, 15 g of methyl methacrylate, 13 g of n-butyl methacrylate, and 52 g of styrene, those as monomers, were added, and blowing of $N_2$ into the flask was started. A mixture in the flask was stirred so as to initiate polymerization. While the mixture was being stirred, a temperature in the flask was increased to 90° C. Then, a mixed solution containing 38.45 g of PGMEA and 1.0 g of t-butyl peroxy 2-ethylhexanoate as a polymerization initiator was continuously dropped via a dropping nozzle into the flask over 2 hours. The dropping speed was maintained constant during the dropping.

After the dropping was completed, an obtained polymerization reaction solution was left for aging at 90° C. for 1 hour.

Then, a mixed solution containing 25.10 g of PGMEA and 0.3 g of t-butyl peroxy 2-ethylhexanoate was dropped into the polymerization reaction solution over 1 hour. After the polymerization reaction solution was further left for aging at 90° C. for 1 hour, 1.0 g of 1,1,3,3-tetramethylbutylperoxy 2-ethylhexanoate was added thereto at once.

The polymerization reaction was then left for aging at 90° C. for 3 hours. After a temperature of the polymerization reaction solution was increased until a reflux of the solvent was observed, the polymerization reaction solution was left for aging for 1 hour. After that, the polymerization was terminated.

Thus obtained adhesive compositions of Example 1 and Comparative Example 1 were compared in terms of adhesive strength at 140° C., generated gas, heat resistance, flexibility, moisture absorbency, and alkaline resistance. The comparison results were shown in Table 2.

TABLE 2

| Evaluation Result | Example 1 | Comparative Example 1 |
| --- | --- | --- |
| Adhesive Strength at High Temperature (140° C.) | G | P |
| Generated Gas | G | G |
| Heat Resistance | G | G |
| Flexibility | G | G |
| Moisture Absorbency | G | G |
| Alkaline Resistance | G | G |

Further, the adhesive compositions of Example 1 and Comparative Example 1 were compared in terms of adhesive strength. The comparison results were shown in Table 3 and FIG. 1.

Figure 1:
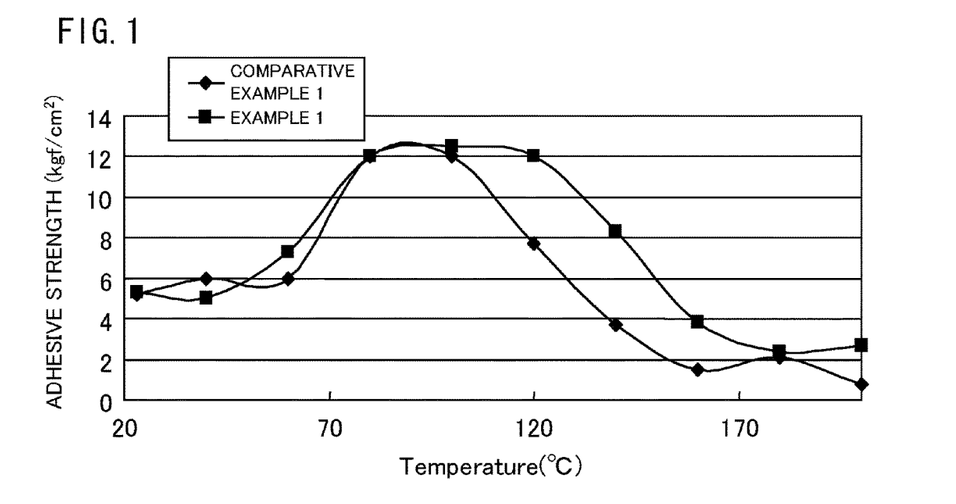
FIG. 1 shows results of comparison of adhesive strength between adhesive compositions under different temperature conditions in Examples of the present invention.

In FIG. 1, a horizontal axis indicates a temperature condition, and a vertical axis indicates an adhesive strength (kgf/cm$^2$),

TABLE 3

| | Adhesive strength (kgf/cm$^2$) at each temperature condition | | | | | | | | | |
| --- | --- | --- | --- | --- | --- | --- | --- | --- | --- | --- |
| | 23° C. | 40° C. | 60° C. | 80° C. | 100° C. | 120° C. | 140° C. | 160° C. | 180° C. | 200° C. |
| Comparative Example 1 | 5.2 | 6.0 | 6.0 | 12.0 | 12.0 | 7.7 | 3.7 | 1.5 | 2.1 | 0.8 |
| Example 1 | 5.3 | 5.0 | 7.3 | 12.0 | 12.5 | 12.0 | 8.3 | 3.8 | 2.4 | 2.7 |

The adhesive compositions of Example 1 and Comparative Example 1 were further compared in terms of adhesiveness. The comparison results were shown in Table 4.

TABLE 4

| | Adhesiveness at each temperature condition | | | |
| --- | --- | --- | --- | --- |
| | 23° C. | 60° C. | 140° C. | 200° C. |
| Comparative Example 1 | G | G | P | P |
| Example 1 | G | G | G | P |

Figure 2:
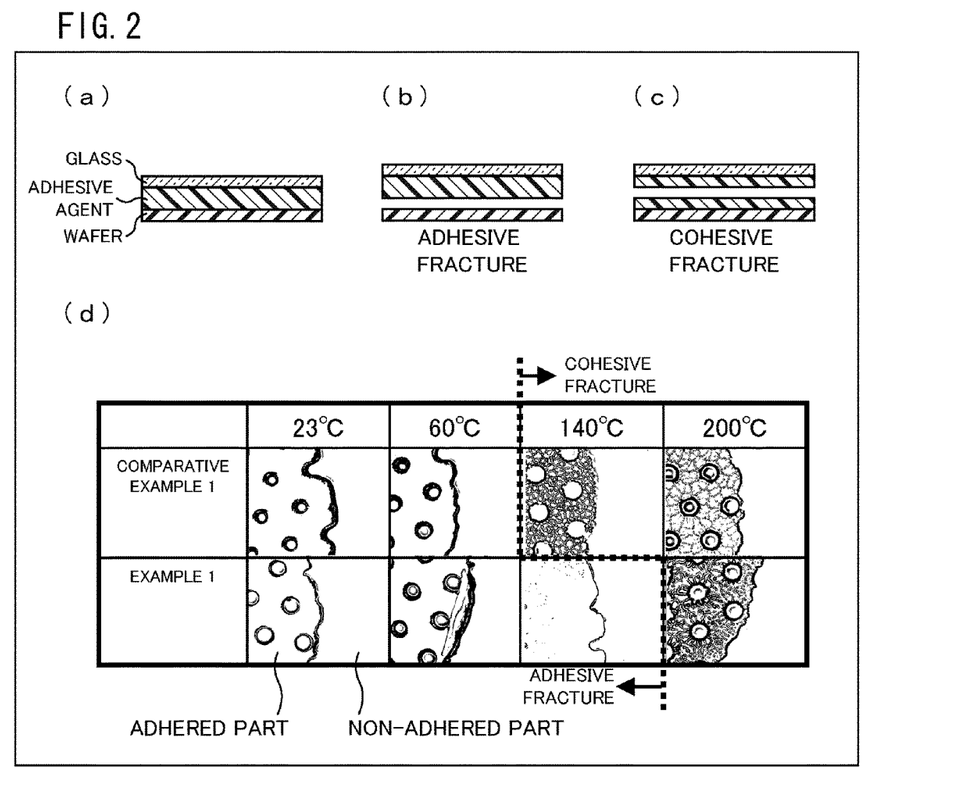
FIG. 2 shows results of comparison of adhesiveness between adhesive compositions in Examples of the present invention.

The following deals with the comparison results of adhesiveness in more detail with reference to FIG. 2. FIG. 2 schematically illustrates the comparison results of adhesiveness. (a) of FIG. 2 illustrates that a silicon wafer is attached to a glass plate via an adhesive composition. When the glass substrate is detached from the silicon wafer, the adhesive composition is stripped off as shown in (b) of FIG. 2 or (c) of FIG. 2. (b) of FIG. 2 schematically illustrates a state in which the adhesive composition is stripped off due to adhesive fracture, and the state is evaluated as "G" in Table 4. On the other hand, (c) of FIG. 2 schematically illustrates a state in which the adhesive composition is stripped off due to cohesive fracture, and the state is evaluated as "P" in Table 4.

After the adhesiveness was evaluated under each of the temperature conditions, a surface of the silicon wafer was observed by use of an optical microscope. The results were shown in (d) of FIG. 2. As shown, for example, in a column of 23° C. of Example 1, a region (adhered part) to which the adhesive composition was applied is shown on the left side, and a region (non-adhered part) to which the adhesive composition was not applied is shown on the right side.

In regard to columns, in (d) of FIG. 2, corresponding to ones evaluated "G" in Table 4, it was observed that no adhesive composition remained and the adhesive composition was stripped off due to adhesive fracture. Meanwhile, in regard to columns, in (d) of FIG. 2, corresponding to ones evaluated "P" in Table 4, it was observed that the adhesive composition remained and the adhesive composition was stripped off due to cohesive fracture.

As such, it was demonstrated that the adhesive composition of Example 1 exhibited an excellent adhesiveness even at 140° C., while the adhesive composition of Comparative Example 1 exhibited adhesion failure at 140° C.

As described above, an adhesive composition of the present invention is an adhesive composition whose main component is a polymer prepared by copolymerizing a monomer composition containing styrene, a (meth)acrylic acid ester having a cyclic structure, and an alkyl(meth)acrylate. The monomer composition further contains a carboxylic acid having an ethylenic double bond, a bifunctional monomer, and a styrene macromonomer, and the polymer has a styrene block segment.

Since the monomer composition contains a carboxylic acid having an ethylenic double bond, the adhesive composition has more polar groups, thereby improving polarity of the adhesive composition on an interface between the adhesive composition and an adhered surface to which the adhesive composition is applied. In addition, dissociation between molecular chains in the adhesive composition is suppressed in a high temperature environment.

Further, since the monomer composition contains a bifunctional monomer, part of constituent molecules of an obtained adhesive composition is crosslinked by the bifunctional monomer, thereby increasing an average molecular weight of the adhesive composition. Accordingly, even if an amount of the carboxylic acid to be used is slightly reduced, it is still possible to obtain effects such as improvement in heat resistance. As a result, it is possible to successfully improve the alkaline resistance of the adhesive composition.

Moreover, since the monomer composition contains a styrene macromonomer, an obtained adhesive composition has a styrene block structure derived from the styrene macromonomer. This causes an average molecular weight of the adhesive composition to be increased. Further, this suppresses dissociation between molecular chains in the adhesive composition in a high temperature environment. Even if an amount of the carboxylic acid to be used is slightly reduced, it is still possible to obtain effects such as improvement in heat resistance. As a result, it is possible to successfully improve the alkaline resistance of the adhesive composition.

Furthermore, since the polymer has a styrene block segment, dissociation between molecular chains in the adhesive composition is suppressed in a high temperature environment. Further, it is possible to prevent generation of gas on an interface between the adhesive composition and an adhered surface to which the adhesive composition is applied. This prevents detachment and the like of an adhesive agent due to the generation of gas on the interface, and improves the adhesive strength at a high temperature. Even if an amount of the carboxylic acid to be used is slightly reduced, it is still possible to obtain effects such as improvement in heat resistance. Consequently, it is possible to successfully improve the alkaline resistance of the adhesive composition.

As a result, it is advantageously possible to provide an adhesive composition (i) which has heat resistance, adhesive strength even in a high temperature environment (especially, in a range from 140° C. to 200° C.), and high alkaline resistance, and (ii) which can be easily stripped off after the adhesive composition has been subjected to a high temperature process.

A film adhesive of the present invention includes: a film; and an adhesive layer on the film, containing the adhesive composition. This make it possible to obtain a film adhesive (i) which has high heat resistance, high adhesive strength in a high temperature environment, and alkaline resistance, and (ii) which can be easily stripped off after the film adhesive has bee subjected to a high temperature process.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

An adhesive composition and a film adhesive according to the present invention (i) have high heat resistance, alkaline resistance, and low moisture absorbency, (ii) generates little gas when heated, and (iii) can be easily stripped off by use of a stripping solution. Hence, the adhesive composition and the film adhesive according to the present invention can be suitably used in processing of a semiconductor wafer or a chip, which processing includes a high temperature process, a high vacuum process, and a process which uses various chemicals such as alkaline.

The invention claimed is:

1. An adhesive composition whose main component is a polymer prepared by copolymerizing a monomer composition containing styrene, a (meth)acrylic acid ester having a cyclic structure, and an alkyl(meth)acrylate having a chain structure,
the monomer composition further containing a carboxylic acid having an ethylenic double bond, a bifunctional monomer having two functional groups, and a styrene macromonomer, and
the polymer having a styrene block segment.

2. The adhesive composition as set forth in claim 1, wherein:
the amount of carboxylic acid is 1 to 10 parts by mass, based on 100 parts by mass of the styrene, the (meth)acrylic acid ester, and the alkyl(meth)acrylate.

3. The adhesive composition as set forth in claim 1, wherein:
the carboxylic acid is represented by Formula (1):

wherein $R^1$ is a C2 to C20 organic group having a (meth)acryloyl group or a vinyl group; and m represents an integer of 1 to 3.

4. The adhesive composition as set forth in claim 3, wherein $R^1$ has an oxygen atom.

5. The adhesive composition as set forth in claim 1, wherein:
the carboxylic acid is (meth)acrylic acid or a carboxylic acid represented by Formula (2):

where $R^2$ is a hydrogen atom or a C1 to C4 alkyl group; and $R^3$ is a divalent C1 to C5 alkylene group or a divalent C4 to C20 organic group having a cyclic structure.

6. The adhesive composition as set forth in claim 5, wherein $R^2$ or $R^3$ has an oxygen atom.

7. The adhesive composition as set forth in claim 1, wherein:
the bifunctional monomer has two functional groups selected from the group consisting of a (meth)acryloyl group and a vinyl group.

8. The adhesive composition as set forth in claim 1, wherein:
the bifunctional monomer is at least one monomer selected from compounds represented by Formula (3):

wherein $R^4$ is an organic group selected from a divalent C2 to C20 alkyl group and a divalent C6 to C20 organic group having a cyclic structure, and $X^1$ and $X^2$ are independently a (meth)acryloyl group or a vinyl group.

9. The adhesive composition as set forth in claim 8, wherein $R^4$ has an oxygen atom.

10. The adhesive composition as set forth in claim 1, wherein:
the bifunctional monomer is at least one functional monomer selected from the group consisting of dimethyloltricyclodecane diacrylate, neopentyl glycol diacrylate, 1,9-nonanediol acrylate, naphthalene diacrylate, and compounds represented by Formula (4):

Chem. 4

(4)

wherein $R^5$ and $R^6$ are independently ethylene oxide or propylene oxide; and n and S independently represent an integer of 0 to 4.

11. The adhesive composition as set forth in claim 1, wherein:
the amount of bifunctional monomer is 0.1 to 0.5 parts by mass, based on 100 parts by mass of the styrene, the (meth)acrylic acid ester, and the alkyl(meth)acrylate.

12. The adhesive composition as set forth in claim 1, wherein:
the styrene macromonomer has a styrene block structure and organic groups positioned on both ends of the styrene block structure, and
at least one of the organic groups has a carbon-carbon double bond.

13. The adhesive composition as set forth in claim 1, wherein:
the styrene macromonomer is represented by Formula (5):

(5)

wherein $R^7$ and $R^8$ are each independently selected from the group consisting of C1 to C10 organic groups having at least one carbon-carbon double bond.

14. The adhesive composition as set forth in claim 13, wherein $R^7$ or $R^8$ has an oxygen atom.

15. The adhesive composition as set forth in claim 1, wherein:
a total amount of the styrene and the styrene macromonomer is 30 to 90 parts by mass, based on 100 parts by mass of the monomer composition, and the amount of styrene macromonomer is 5 to 40 parts by mass, based on the total mass of the styrene and the styrene macromonomer.

16. A film adhesive comprising:
a film; and
an adhesive layer on the film, containing an adhesive composition as set forth in claim 1.

* * * * *

UNITED STATES PATENT AND TRADEMARK OFFICE
CERTIFICATE OF CORRECTION

PATENT NO. : 8,148,457 B2
APPLICATION NO. : 12/514633
DATED : April 3, 2012
INVENTOR(S) : Takahiro Asai et al.

It is certified that error appears in the above-identified patent and that said Letters Patent is hereby corrected as shown below:

Title page: item (73) Assignee: "Tokyo Ohta Kogyo Co., Ltd., Kanagawa (JP)" should read -- Tokyo Ohka Kogyo Co., Ltd., Kanagawa (JP) --

Signed and Sealed this
Tenth Day of July, 2012

David J. Kappos
*Director of the United States Patent and Trademark Office*